United States Patent [19]
Goforth

[11] Patent Number: 5,343,788
[45] Date of Patent: Sep. 6, 1994

[54] HYDRODYNAMIC SUPPORT PUMP

[75] Inventor: Henry E. Goforth, Hendersonville, N.C.

[73] Assignee: Spego, Inc., Asheville, N.C.

[21] Appl. No.: 937,262

[22] Filed: Aug. 31, 1992

[51] Int. Cl.$^5$ .................... B23B 13/08; B23Q 5/26
[52] U.S. Cl. ........................ 82/127; 414/17; 414/18; 384/398
[58] Field of Search ............ 82/126, 127; 414/17, 414/18; 60/318, 413, 414, 415; 137/207, 593; 138/26, 30, 31; 384/114, 398

[56] References Cited

U.S. PATENT DOCUMENTS

| Re.29,905 | 2/1979 | Scheurer | 82/126 |
| 2,510,549 | 6/1950 | Buchl | 384/398 |
| 4,406,190 | 9/1983 | Mason | 82/127 |
| 4,427,308 | 1/1984 | Sandberg | 384/398 |
| 4,726,693 | 2/1988 | Anderson et al. | 384/114 |
| 4,889,024 | 12/1989 | Geiser et al. | 82/127 |

Primary Examiner—William E. Terrell
Attorney, Agent, or Firm—James H. Laughlin, Jr.

[57] ABSTRACT

Apparatus for an automatic bar feeder is given which provides fluid to the space between the barstock and guide tube having a pump integral to the piston pusher to control pressure on the barstock being fed to the machine tool.

2 Claims, 2 Drawing Sheets

HYDRODYNAMIC SUPPORT PUMP

BACKGROUND OF THE INVENTION

1. Field of Invention

This invention relates to barfeed apparatus for machine tools which allow barstock much longer than the spindle itself to be supported and guided.

This invention specifically relates to an apparatus and device to provide fluid to the space between the barstock and guide tube, for hydrodynamic support, of the type disposed within the guide tube.

2. Related Art

Hydraulic barfeed apparatus employing the hydrodynamic phenomena are commonly known. One such design is shown in U.S. Pat. No. 3,945,506 which describes a device that comprises a push piston with play in the guiding tube and a internal passage for the flow of oil to the barstock. As the needed flow around and through the push piston, for hydrodynamic support, is determined by the size and shape of the barstock being feed, and as the minimum pressure required to advance the barstock must be maintained on the push piston, to prevent the barstock bowing, using the pressure to control the flow works against the desired hydrodynamic support of the barstock. As fluid is constantly lost out the front of the barfeed apparatus, ineffectual flow results in insufficient or scanty filling of the guide tube, appreciable lessening the hydrodynamic support for the bars in the system. If a greater flow is needed to fill the area between the barstock and guide tube, for a smaller bar or bar shape, the internal passage must be increased, correspondingly for a larger bar or a shape of greater volume, requiring less flow, the internal passage must be decreased in order to maintain pressure on the push piston. The internal passage can be adjusted, however the adjustment is manual and requires the machine to be shut down and the push piston removed, causing loss in production. Improper adjustment results in increased, or loss, of pressure on the pusher, and little or no hydrodynamic support, increasing vibration and noise thus limiting the speed of the spindle and reducing productivity.

In yet another prior art design as described in U.S. Pat. No. 4,507,992, a push piston and a distribution system to supply oil to the push piston and between the barstock and guide tube to form an oil cushion is shown. The flow of oil delivered by the system can only be adjusted manually and a blockage in one or more of the distribution points could easily go undetected. Air trapped between distribution points, blockages at distribution points, and maladjustment can result in insufficient fluid in the guide tubes and excess, or low pressure on the barstock, appreciable lessening the hydrodynamic support. The resulting loss of support increases vibration and noise, limiting the speed of the spindle, reducing productivity.

SUMMARY OF THE INVENTION

The invention provides for a solution to these described problems of the prior art and other problems with a simple, but effective design that provides fluid to the space between the bar and the guide tube.

It is an object and advantage of this invention to allow the proper pressure to be maintained on the barstock while providing the necessary flow around the barstock, regardless of size or shape. Thereby providing a more congruous environment and flawless support for hydrodynamic operation.

It is a further object and advantage of this invention to provide an apparatus which can be readily added to existing systems.

Other objects and advantages can be seen from a full understanding of the invention.

BRIEF DESCRIPTION OF THE DRAWINGS

A preferred embodiment of the invention will be described further with references to the accompanying drawings in which.

DETAILED DESCRIPTION OF THE INVENTION

Figure 1:
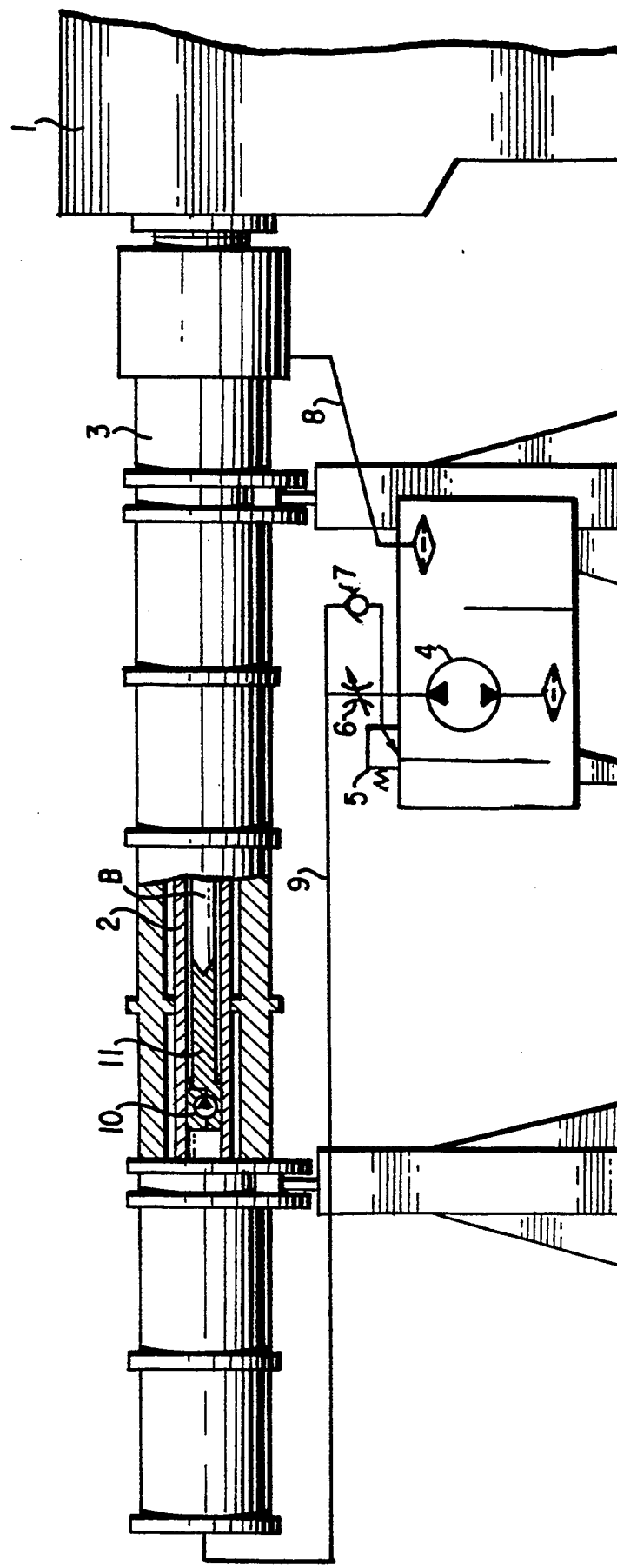
FIG. 1 is a schematic side elevation of a bar feed apparatus, partially cut, equipped in accordance with the invention.

At the right of FIG. 1 appears an automatic lathe 1 of a type generally recognized and well known in the art. At the rear of automatic lathe 1, in line with the axis of the headstock, is a guide tube 2, in a hydraulic bar feeder 3, containing a bar B to be machined. Hydraulic pump 4 with pressure control 5, speed control 6, and check valve 7 provide the pressure necessary for advancing the barstock through a line 9 to the rear of the guide tube 2. The piston pusher 11 advances the bar B to the lathe 1, and the hydrodynamic support pump 10 supplies the fluid ahead of the piston pusher 11 for hydrodynamic support around the bar B. Fluid is returned to the hydraulic system through collector line 8.

Figure 2:
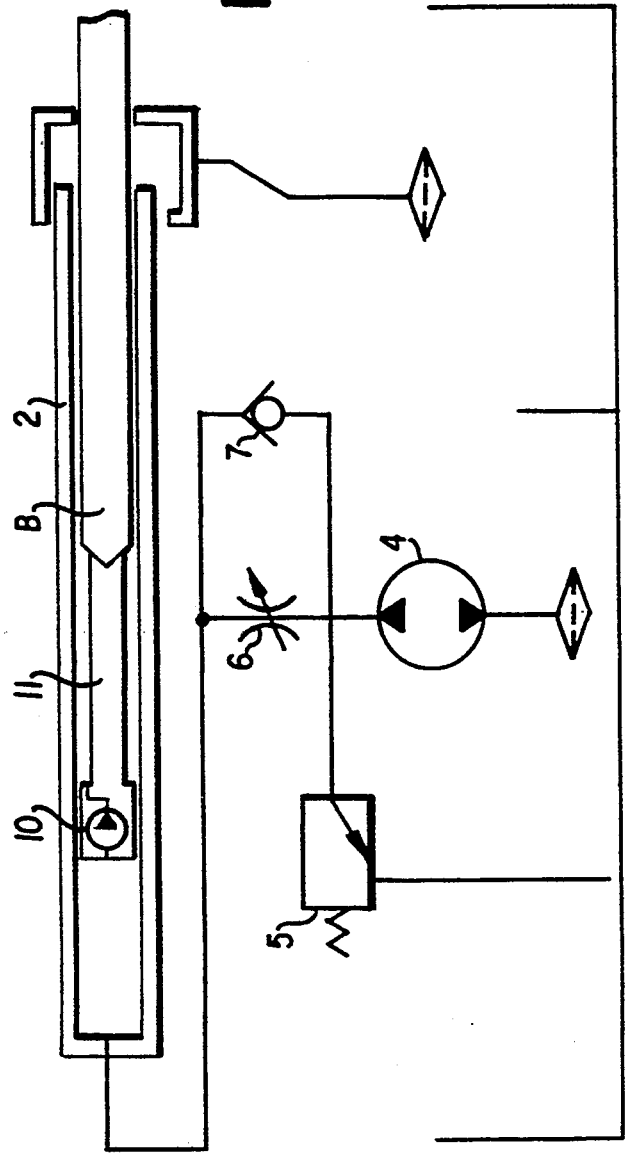
FIG. 2 is a schematic view of an embodiment of the invention.

In one preferred embodiment as shown in FIG. 2, the fluid is supplied under pressure by the main pump 4, the pressure necessary for advancing the bar B is controlled by the relief valve 5, and the flow (or speed) is controlled by a flow control 6. Ample fluid is provided to the hydrodynamic support pump 10 for its output at higher rotation speeds. A check valve 7 allows the hydraulic flow to be reversed thereby retracting the piston pusher 11 for loading a new bar. By more effectively maintaining fluid in the space between the bar B and the guide tube 2 while still maintaining the minimum force of the piston pusher 11 necessary for advancing the bar B, this invention provides a more congruous environment and flawless support for dynamic operation, allowing greater rotation speeds with less vibration and noise.

Figure 3:
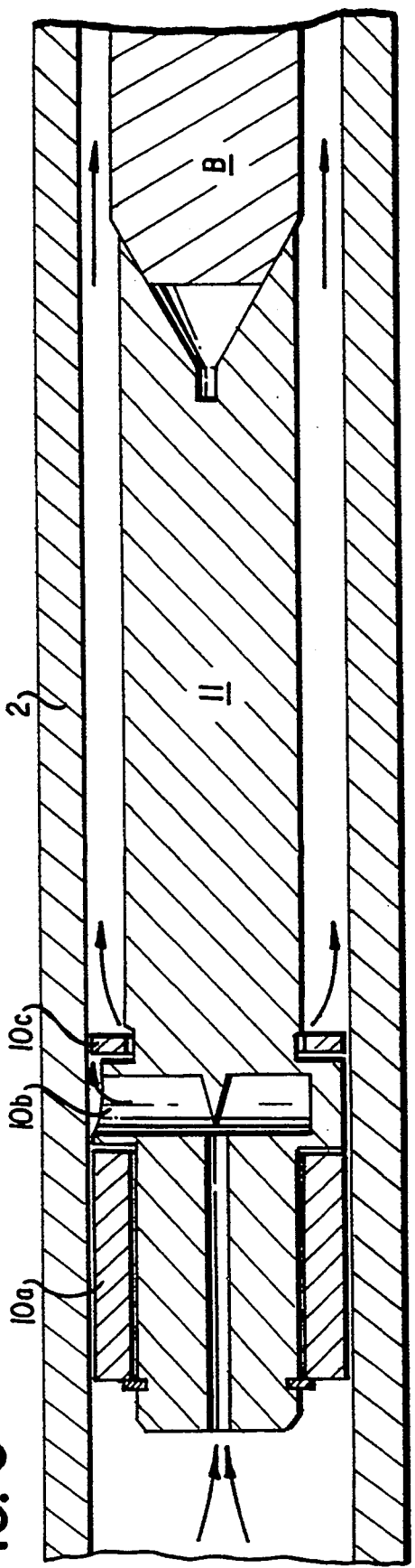
FIG. 3 is hydraulic circuitry for supporting the apparatus illustrated in FIGS. 1 and 2.

A preferred type of hydrodynamic support pump is detailed in FIG. 3. It is comprised of a hydraulic bearing 10a, a centrifugal pump 10b, and a priming ring 10c. As bar B, is rotated by the machine tool spindle pump 10a which is integral to the piston pusher 11 is driven. Fluid is pulled in from behind the piston pusher 11, by the pump 10b, and pumped through the priming ring 10c, around the front portion of the piston pusher 11, and into the space between the bar B and the guide tube 2.

It will be appreciated that through this invention, the feature of having sufficient volume to fill the space adequately is accomplished. By employing the unique pump system of this invention, the greater the space to be filled, the greater the volume of fluid pumped for the output volume of pump 10b is directly related to the pressure in the space between bar B and the guide tube 2. As the front end of the bar feeder is open to the atmosphere, the pressure is determined by the resistance to flow. As the speed of the spindle is increased, and the need for hydrodynamic support greater, the faster the pump 10b turns and consequently the greater the flow to the space between the bar B and the guide tube 2.

As pump 10b is face driven by the bar B, the face drive acts as a safety clutch, slipping if the pressure ahead of the piston pusher 11 should become greater than the pressure behind the piston pusher 11, thereby insuring sufficient contact for guiding the end of the bar at all times. The priming ring 10c helps keep the pump primed during brief stops, spindle reverses, and retraction for loading a new bar.

The preceding detailed descriptions illustrate the unique and novel hydrodynamic support pump of this invention. While the preferred embodiment of the present invention has been described in detail, it its apparent that modifications and adaptations of this embodiment will occur to those skilled in the art. However, it is to be expressly understood that such modifications and adaptations are within the spirit and scope of the present invention as set fourth in the following claims.

What is claimed is:

1. In a machine tool having a machine tool spindle for rotating a barstock and a hydraulic barfeed apparatus for feeding the barstock to the machine tool spindle, said hydraulic barfeed apparatus comprising a guide tube containing the barstock with a space therebetween and a piston pusher in the guide tube for pushing the barstock, the improvement comprising a pump disposed in said guide tube driven by the rotation of the barstock to provide fluid to the space between the barstock and the guide tube.

2. The apparatus of claim 1 wherein said pump is integral with the piston pusher.

* * * * *